United States Patent [19]

Sommer

[11] 4,138,131

[45] Feb. 6, 1979

[54] OCCUPANT WEIGHT ACTUATED STEERING UNLOCKING MECHANISM FOR WHEELED VEHICLES AND THE LIKE

[76] Inventor: Frederick A. Sommer, 4238 Sibley Ave., Cincinnati, Ohio 45236

[21] Appl. No.: 888,698

[22] Filed: Mar. 21, 1978

[51] Int. Cl.² ............................................... B62K 9/00
[52] U.S. Cl. ..................... 280/220; 280/272; 280/87.02 R; 280/92
[58] Field of Search .................. 280/271, 272, 289 L, 280/270, 274, 263, 264, 267, 268, 220, 89, 92, 87.02 R; 180/99, 101, 102

[56] References Cited

U.S. PATENT DOCUMENTS

| 579,664 | 3/1897 | McConley | 280/272 |
| 1,362,086 | 12/1920 | Detwiler | 280/87.02 R |

Primary Examiner—Joseph F. Peters, Jr.
Assistant Examiner—Michael Mar
Attorney, Agent, or Firm—Melville, Strasser, Foster & Hoffman

[57] ABSTRACT

An unlocking mechanism for use with wheeled vehicles and the like to unlock the steering post to permit the vehicle to be steered in response to the occupant's weight on the vehicle. The mechanism includes a sleeve-type bearing support for slidingly receiving and pivotally guiding the steering post and locking pin associated with the steering post which is restrained in a matching groove in the bearing support to prevent rotation of the steering post when the vehicle is unoccupied, but is spaced from the groove to permit rotation of the steering post when the vehicle is occupied.

8 Claims, 9 Drawing Figures

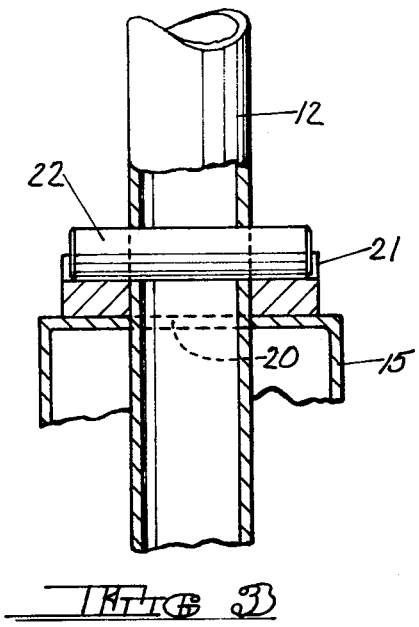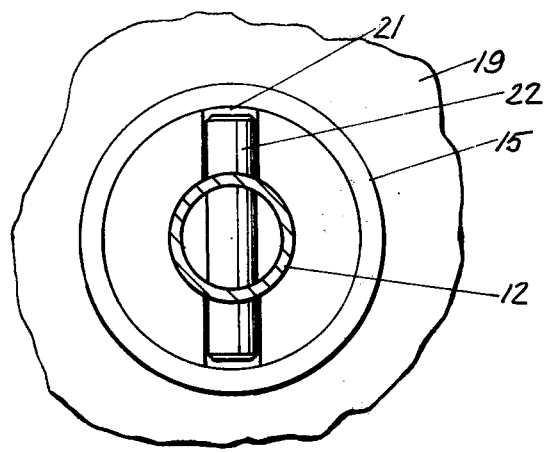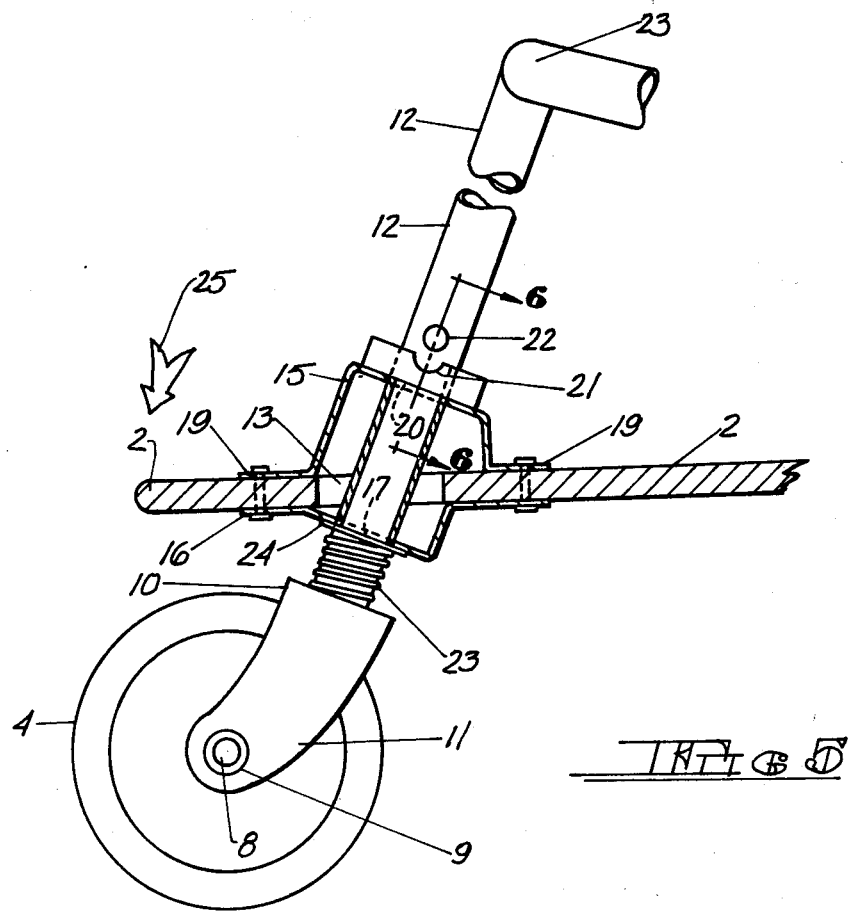

OCCUPANT WEIGHT ACTUATED STEERING UNLOCKING MECHANISM FOR WHEELED VEHICLES AND THE LIKE

BACKGROUND OF THE INVENTION

1. Field of the Invention.

The present invention relates generally to devices for preventing rotational movement of the steering post of a wheeled vehicle or the like, and more particularly to such a device which is actuated by the occupant's weight on the vehicle to permit rotation of the steering post.

2. Description of the Prior Art.

Wheeled vehicles, particularly those of the occupant-propelled variety, have often included devices to prevent turning of the guide wheels in order that the vehicle may be propelled in a substantially straight line.

For example, in U.S. Pat. No. 591,864 issued Oct. 19, 1897 to Joseph H. Meyer, such a device is described in connection with a bicycle-type vehicle to prevent the forward or guide wheel from turning when the hands are removed from the handle-bar or when pressure on the handle-bar is removed. Such a device requires a conscious effort on the part of the occupant to lock and unlock the steering mechanism to permit "hands-off" operation.

Another type of steering locking device is illustrated in U.S. Pat. No. 3,069,182, issued Dec. 18, 1962 to Dennis F. Hufford, and is illustrated in connection with a coaster wagon. In this type of design, the guide wheels of the vehicle are maintained in a straight-ahead position by the force exerted by a bias spring, which may be overcome by the occupant to steer the wagon. Such a construction has proven particularly useful for "belly-flop" entry of the vehicle, to insure that the guide wheels do not become turned, which may result in the occupant being thrown from the vehicle.

SUMMARY OF THE INVENTION

In each of the prior art designs, it is necessary that the occupant exert some conscious effort to unlock the steering post so that the vehicle may be steered. The steering unlocking mechanism of the present invention overcomes this limitation by automatically unlocking the vehicle steering post in response to the weight of the occupant on the vehicle.

Although for purposes of an exemplary showing, the unlocking mechanism will be described in association with a three-wheeled or four-wheeled coaster wagon-type vehicle, it will be understood that the inventive principle is applicable to other types of wheeled vehicles such as velocipedes, bicycles, skateboards, scooters, or any other type of vehicle or wheeled apparatus where constrained rotation of the guide wheels is desirable. Furthermore, the inventive principle is also adaptable to vehicles of the non-wheeled variety, such as those having steerable rudders or skids such as bobsleds and the like.

A typical type of wheeled vehicle with which the steering unlocking mechanism may be used comprises a substantially planar occupant supporting platform or section, having at least one wheel rotatably mounted near the rear portion of the platform which supports the platform from the ground. A steering post is pivotally attached near the front portion of the platform for steering the vehicle, and contains, at its lower end, at least one guide wheel rotatably mounted to the steering post for supporting the front portion of the platform from the ground. In the case of a four-wheeled vehicle, two wheels, rotatably mounted on a suitable axle or the like, would be supplied at the rear of the vehicle, and two similar wheels rotatably mounted on an axle or the like will be supplied at the front end of the vehicle. In the case of a three-wheeled vehicle, two spaced wheels would be provided at the rear of the vehicle, and a single wheel rotatably mounted by means of a fork or the like, would support the front end of the vehicle.

The front end of the vehicle contains a pair of cup-like bearing supports, each bearing support being disposed on an opposite surface of the supporting platform. The bearing supports and the supporting platform contain coaxial apertures which slidingly receive and pivotally guide the steering post passing through the apertures. The axis of the bearing supports are so aligned that upper end of the steering post is inclined away from the forwardmost end of the vehicle to provide increased stability.

The lowermost end of the steering post terminates in a fork which rotatably supports the forward guide wheel or wheels as is well known in the art. A compression spring is disposed between the upper surface of the fork and the lower most surface of the lower bearing support, and surrounds the steering post. A bearing surface such as a washer or the like may be provided between the upper end of the compression spring and the lowermost surface of the lower bearing support to reduce friction.

In the structure thus described, the forward guide wheel and its attached steering post are free to pivot to provide guidance of the vehicle. In addition, when a downward force is exerted on the upper surface of the supporting platform, the forward end of the supporting platform slides downwardly along the steering post to compress the compression spring, and unlock the locking mechanism as will be described hereinafter.

The uppermost surface of the upper bearing support is provided with a groove or channel. This groove is dimensioned to accept a cooperating locking pin extending outwardly transversely of upper end of the steering post, such that when no downward force is applied against the upper surface of the supporting platform, the locking pin is engaged within the groove, thereby preventing rotation of the steering post and holding the guide wheel in a straight ahead direction. However, when a downward force is applied against the upper surface of the support platform, the forewardmost end of the platform slides downwardly along the steering post, disengaging the groove from the locking pin, to permit pivotal movement of the steering post for guiding the vehicle. When the downward force is again released from the upper surface of the supporting platform, the compression spring urges the forewardmost end of the platform upwardly to again engage the groove and locking pin and prevent pivotal movement of the steering post.

In an alternate construction, the locking pin associated with the upper end of the steering post is replaced by a plate-like member having one or more ribs on its lowermost surface which cooperate with matching channels inscribed in the upper surface of the upper bearing support. When in the locked position, the ribs engage the grooves or channels to prevent pivotal movement of the steering post. However, when a downward force is exerted on the upper surface of the supporting platform to cause the forward end of the supporting platform to move downwardly, the ribs are disengaged from the channels to permit pivotal movement of the steering post.

It will thus be observed that the steering unlocking mechanism of the present invention is entirely automatic in response to the weight of the occupant on the vehicle, and does not require a conscious effort to unlock the steering post as in prior art configurations.

BRIEF DESCRIPTION OF THE DRAWINGS

FIG. 3 is a section view taken along section lines 3—3 of FIG. 2.

FIG. 4 is a cross sectional view taken along section lines 4—4 of FIG. 2.

FIG. 5 is a fragmentary side elevation view, partly in cross section, of the unlocking mechanism of the present invention in the unlocked position.

DESCRIPTION OF THE PREFERRED EMBODIMENTS

Figure 1:
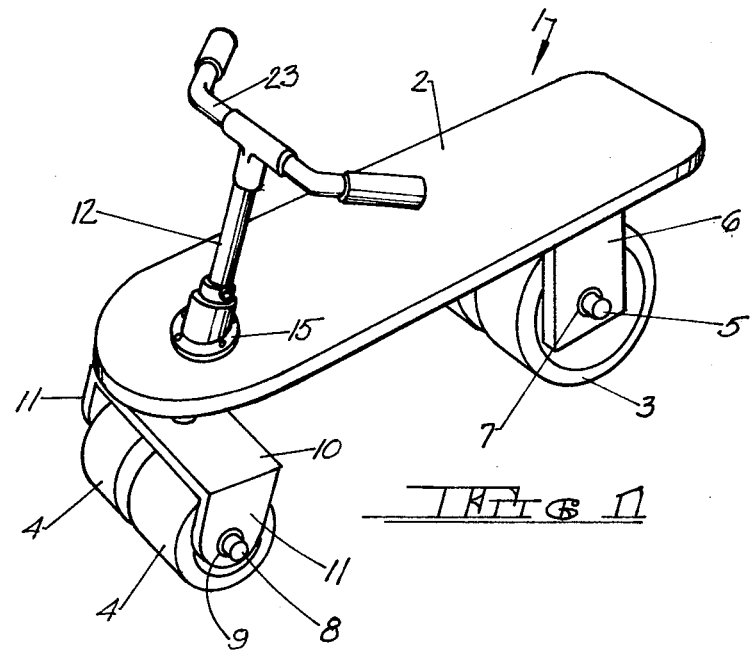
FIG. 1 is a perspective view of a typical wheeled vehicle employing the unlocking mechanism of the present invention.

FIG. 1 is a perspective view of a typical wheeled vehicle, shown generally at 1, employing the unlocking mechanism of the present invention. Vehicle 1 comprises a substantially planar occupant supporting platform 2 supported from the ground by a pair of rear wheels, one of which is shown at 3, and by a pair of front wheels 4. Rear wheels 3 are rotatably attached to an axle 5 passing through the center of each wheel, as is well understood in the art. Axle 5 is attached to the underside of supporting platform 2 by means of a pair of mounting brackets, one of which is shown at 6. The upper end of each bracket 6 is attached to the lower side of platform 2, while the lower end of each bracket 6 contains an aperture 7 for accepting the ends of axle 5.

In a similar manner, front wheels 4 are rotatably secured to an axle 8, the ends of which pass through cooperating apertures 9 in mounting fork 10. Fork 10 comprises a generally U-shaped mounting bracket, having a substantially planar upper surface supporting a pair of downwardly depending legs 11. As noted, each leg 11 contains an aperture 9 for supporting the ends of axle 8.

Figure 2:
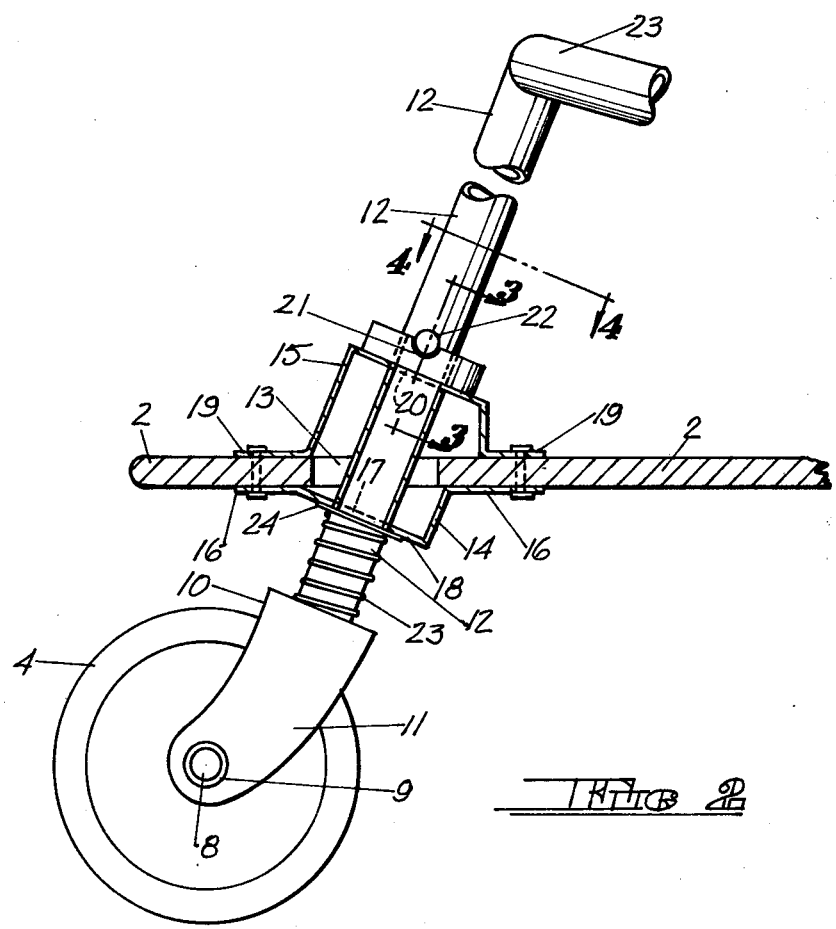
FIG. 2 is a fragmentary side elevation view, partly in cross section, of the unlocking mechanism of the present invention in the locked position.

As is also shown in FIG. 2, the upper surface of fork 10 is attached, approximately at its mid point, to a substantially cylindrical steering post 12, which after passing through a perforation 13 in supporting platform 2, is slidably and rotatably connected to platform 2 by means of a pair of bearing suports 14 and 15 attached to the upper and lower surfaces of platform 2, respectively.

Lower bearing support 14 comprises a cup-shaped member having a mounting flange 16 which is connected, by means of screws, rivets or the like, to the lower surface of platform 2. Bearing support 14 contains a centrally located aperture 17 which slidably and rotatably receives steering post 12. The axis of aperture 17, as well as the surface 18 of bearing support 14 containing aperture 17, is inclined with respect to the plane of supporting platform 2, but is substantially parallel to the upper surface of fork 10. This arrangement permits steering post 12 to be inclined with respect to the perpendicular, giving greater stability to the vehicle. It will be understood, however, that acceptable results may also be obtained by configuring bearing support 14 such that steering post 12 is mounted perpendicular to supporting platform 2.

Upper bearing support 15 is also of cup-like shape and contains a perpherial flange 19 which may also be mounted to the upper surface of supporting platform 2 by screws, rivets or the like. The upper surface of bearing support 15 contains an aperture 20, coaxial with aperture 17, for slidably receiving and pivotally supporting steering post 12. The upper surface of bearing support 15 is substantially parallel to surface 18 of bearing supoort 14, and also contains inscribed therein an essentially semi-cylindrical groove or channel 21 which cooperates with locking pin 22 attached to steering post 12 to prevent pivotal movement of steering post 12 as will be described in more detail hereinafter.

The uppermost end of steering post 12 terminates in a conventional handle-bar arrangement 23 or the like which may be gripped by the occupant's hands to steer vehicle 1. Located beneath handle-bar arrangement 23 and in association with groove 21 of upper bearing support 15 is an essentially cylindrical locking pin 22 extending outwardly from both sides of steering post 12, the longitudinal axis of locking pin 22 being substantially perpendicular to the longitudinal axis of steering post 12. As is best shown in FIG. 2 and FIG. 3, when the unlocking mechanism is in the locked position, locking pin 22 is engaged within groove 21, thereby preventing pivotal movement of steering post 12. It is preferred that the depth of groove 21 be slightly greater than the radius of locking pin 22 so as to fully engage the locking pin and prevent it from being disengaged from the groove. In order to insure that pin 22 is engaged by groove 21 when the vehicle is unoccupied, a compression spring 23 is provided between the upper surface of fork 10 and the lowermost surface of lower bearing support 14 coaxial with steering post 12 which urges supporting platform 2 upwardly so that groove 21 of upper bearing support 15 remains in abutting contact with locking pin 22 when the vehicle platform is not occupied. A flat washer-like bearing plate 24 containing a central aperture coaxial with the axis of steering post 12 may be provided between the upper end of compression spring 23 and lower surface 18 of lower bearing support 14 to decrease the sliding friction between spring 23 and surface 18, thereby permitting steering post 12 to pivot easily.

Figure 6:
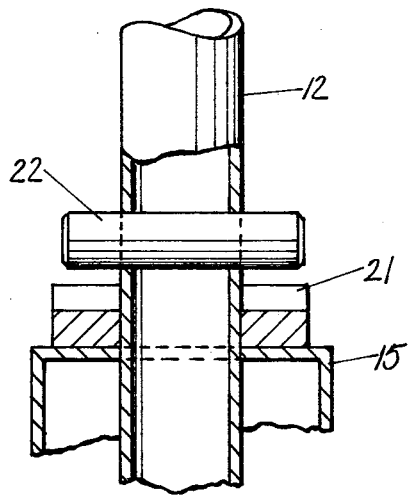
FIG. 6 is a cross sectional view taken along section lines 6—6 of FIG. 5.
Figure 7:
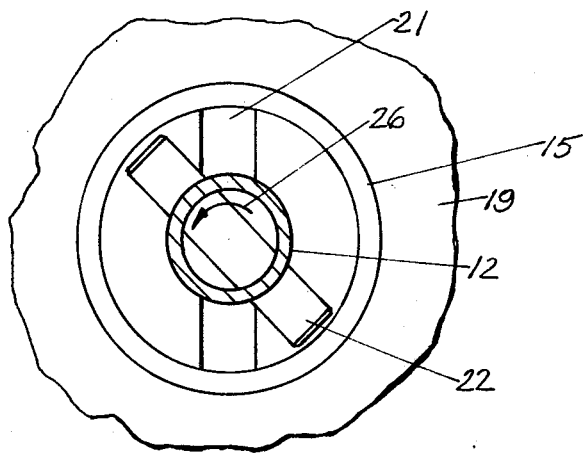
FIG. 7 is a section view taken along section lines 7—7 of FIG. 5.

When a downward force is exerted on the upper surface of supporting platform 2, the forward end of platform 2 slides downwardly along steering post 12 in the direction of arrow 25 against the upward force of compression spring 23, causing platform 2 to assume the position shown in FIG. 5 and FIG. 6 wherein locking pin 22 is brought out of abutting engagement within groove 21. Since locking pin 22 is no longer restrained by groove 21, steering post 12 is free to rotate to provide steerage of the vehicle, as is best shown in FIG. 4 and FIG. 7. In FIG. 4, locking pin 22 is shown aligned with and positioned within groove 21. In FIG. 7, the steering post 12 has been rotated in the direction of arrow 26 to turn the vehicle to the left, such that locking pin 22 is unaligned with and disengaged from cooperating groove 21.

Figure 8:
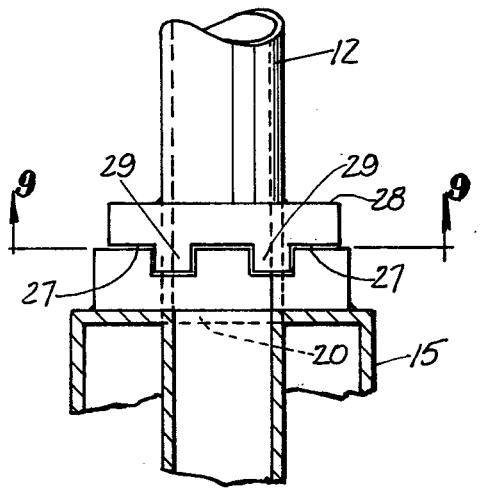
FIG. 8 is a fragmentary side elevation view, partly in cross section, of a second embodiment of the locking mechanism of the present invention.
Figure 9:
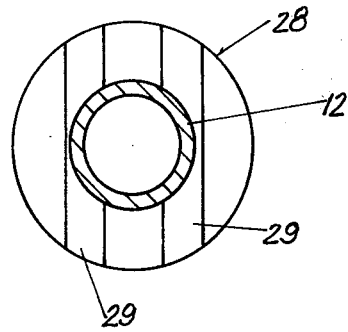
FIG. 9 is a cross sectional view taken along section lines 9—9 of FIG. 8.

An alternative construction for the locking pin and cooperating groove arrangement is illustrated in FIG. 8 and FIG. 9. Here the upper surface of upper bearing support 15 is inscribed with a plurality of substantially parallel channels 27 extending completely across the upper surface of upper bearing support 15. Although channels 27 have been illustrated as rectangular in cross section, it will be understood that they may assume any convenient shape, including the semi-cylindrical shape illustrated in connection with the embodiment of FIG. 2. Plate-like locking member 28 is non-rotatably secured to steering post 12 and overlies the upper surface of upper bearing support 15. The lower surface of locking member 28 contains a plurality of spaced ribs 29 which engage grooves 27 when the unlocking mechanism is in the locked position to prevent pivotal movement of steering post 12. It will be understood that ribs 29 will have a cross sectional shape commeasurate with the shape of grooves 27. As in the embodiment described hereinabove, a downward force on occupant supporting platform 2 will cause the upper surface of upper bearing support 15 to disengage from ribs 29 thereby unlocking member 28 to permit steering post 12 to pivot freely.

It will be understood that various changes in the details, materials, steps and arrangements of parts, which have been herein described and illustrated in order to explain the nature of the invention, may be made by those skilled in the art within the principle and scope of the invention as expressed in the appended claims. For example, while for purposes of an exemplary showing, the wheeled vehicle has been described and illustrated with four wheels, it will be understood that the inventive principles of the unlocking mechanism may be extended to any type of vehicle or vehicle support utilizing any number of wheels. Thus the unlocking mechanism also finds utility with wheeled vehicles such as bicycles, velocipedes, skateboards, casters, etc., as well as with vehicles of the non-wheeled type such as those using steerable runners or skids.

It will further be evident that the unlocking mechanism and/or associated vehicle may be constructed of any suitable material such metal, plastic or the like. In addition, while lower bearing support 14 and upper bearing support 15 have been described and illustrated as separate units, either or both of the bearing supports may be formed as an integral part of supporting platform 2. Finally, compression spring 23, or any similar device, will be so constructed as to permit the unlocking device to operate only upon a predetermined downward force being applied against the upper surface of platform 2. That is, the spring constants of compression spring 23 are selected so that locking pin 22 and groove 21, or ribs 29 and channels 27, as the case may be, become disengaged to permit pivotal movement of steering post 12 only when a predetermined downward force, such as a particular occupant's weight, is applied to the upper surface of support platform 2.

The embodiments of an invention in which an exclusive property or privilege is claimed are as follows:

1. In a wheeled vehicle of the type having a weight supporting section and a steering post associated with the weight supporting section mounting at least one guide wheel for steering the vehicle, the improvement in combination therewith comprising a weight acutated steering unlocking mechanism including:

a. bearing support means affixed to said supporting section for slidingly receiving and pivotally guiding said steering post;
   b. means in association with said steering post and said bearing support means for providing pivotal movement of said steering post with respect to said bearing support means only when a predetermined downward force is applied to said supporting section, said movement providing means comprising first locking means nonrotatably secured to said steering post, second locking means nonrotatably secured to said bearing support means and spring means for urging said first and second locking means into intermeshed engagement to prevent relative rotational movement between said steering post and said bearing support means when a downward force less than said predetermined force is applied to said supporting section, a downward force of at least said predetermined force causing said bearing support means to slidingly advance along said steering post to bring said first and second locking means out of intermeshed engagement to permit relative rotational movement between said steering post and said bearing support means.

2. The unlocking mechanism according to claim 1 wherein said first locking means comprises a locking pin extending outwardly from and transversely of said steering post, and said second locking means comprises a groove inscribed in said bearing support means dimensioned to longitudinally accept at least a portion of said locking pin when said first and second locking means are in intermeshed engagement.

3. The unlocking mechanism according to claim 1 wherein said first locking means comprises a plate-like member having at least one upstanding rib projecting from the surface of said plate-like member adjacent said second locking means, and said second locking means comprises at least one groove inscribed in the surface of said bearing support means adjacent said first locking means, said groove being dimensioned to accept at least a part of said rib when said first and second locking means are in intermeshed engagement.

4. The unlocking mechanism according to claim 1 wherein said bearing support means comprises a first cup-like bearing support secured to the upper surface of said supporting section and a second cup-like bearing support secured to the lower surface of said supporting section, said bearing supports and said supporting section containing substantially coaxial apertures adapted to receive said steering post.

5. The unlocking mechanism according to claim 4 wherein said bearing apertures are so positioned that the longitudinal axis of said steering post is inclined with respect to the plane of said supporting section.

6. The unlocking mechanism according to claim 1 wherein said spring means surrounds said steering post and is positioned between said wheel and said bearing support means.

7. The unlocking mechanism according to claim 6 including a flat plate-like bearing washer surrounding said steering post and interposed between said spring means and said bearing support means to decrease sliding friction therebetween.

8. The unlocking mechanism according to claim 7 wherein said wheel is mounted to said steering post by a fork having an upper planar member and a pair of axle supporting members depending from the ends of said planar member, said axle supporting members supporting at least one axle mounting said wheel, said spring means being interposed between said bearing support means and said planar member of said fork.

* * * * *